United States Patent [19]
Taniguchi

[11] Patent Number: 5,448,563
[45] Date of Patent: Sep. 5, 1995

[54] COMMUNICATION CONTROL METHOD

[75] Inventor: Yasunori Taniguchi, Nagasaki, Japan

[73] Assignee: Mitsubishi Denki Kabushiki Kaisha, Tokyo, Japan

[21] Appl. No.: 276,905

[22] Filed: Jul. 19, 1994

[30] Foreign Application Priority Data

Sep. 2, 1993 [JP] Japan .................................. 5-218823

[51] Int. Cl.$^6$ ........................................... H04L 12/407
[52] U.S. Cl. .................................... 370/85.6; 370/85.3; 340/825.06; 340/825.51
[58] Field of Search ..................... 370/85.1, 85.4, 85.5, 370/85.6, 85.2, 85.3, 85.7, 85.8, 85.15; 340/825.06, 825.07, 825.08, 825.5, 825.51

[56] References Cited

U.S. PATENT DOCUMENTS

| | | | |
|---|---|---|---|
| 4,387,425 | 6/1983 | El-Gohary ...................... | 370/85.1 X |
| 4,667,323 | 5/1987 | Engdahl et al. ................ | 370/85.6 X |
| 4,760,571 | 7/1988 | Schwarz .............................. | 370/85.5 |
| 4,787,083 | 11/1988 | Tanaka ................................ | 370/85.1 |

FOREIGN PATENT DOCUMENTS

| | | | |
|---|---|---|---|
| 59-139743 | 8/1984 | Japan ............................ | H04L 11/00 |
| 62-281595 | 12/1987 | Japan ............................ | H04Q 11/04 |

Primary Examiner—Benedict V. Safourek
Assistant Examiner—Russell W. Blum
Attorney, Agent, or Firm—Burns, Doane, Swecker & Mathis

[57] ABSTRACT

A communication control method for sequentially allocating transmitting rights to a plurality of nodes commonly connected to a single transmission line, wherein each of the nodes forms, when the own node has a transmitting right and when the own node has no data to be transmitted, a predetermined period of a no signal state in which any signal is not transmitted to the transmission line, whereby the circulating time of the transmitting rights from the node having the minimum node number to the node having the maximum node number can be shortened.

14 Claims, 8 Drawing Sheets

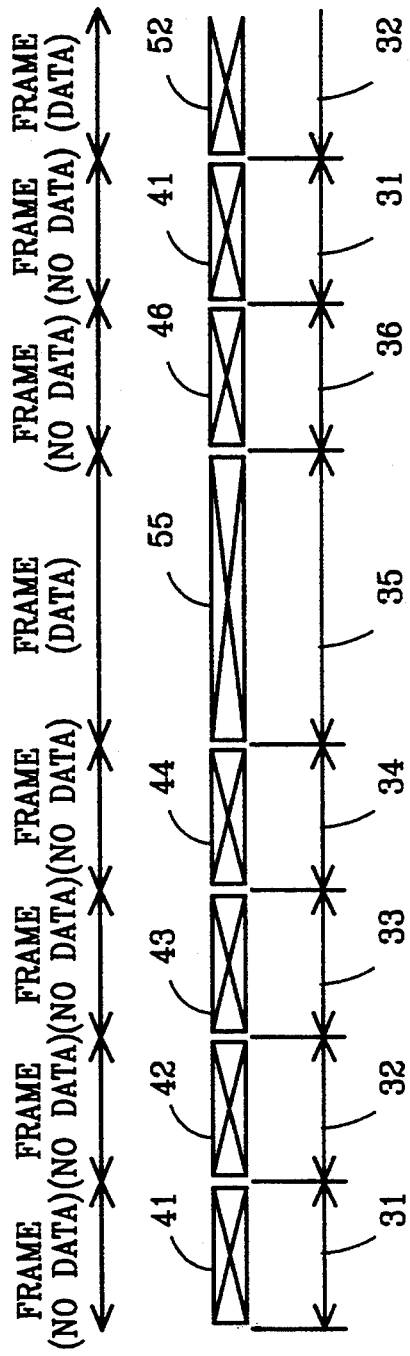
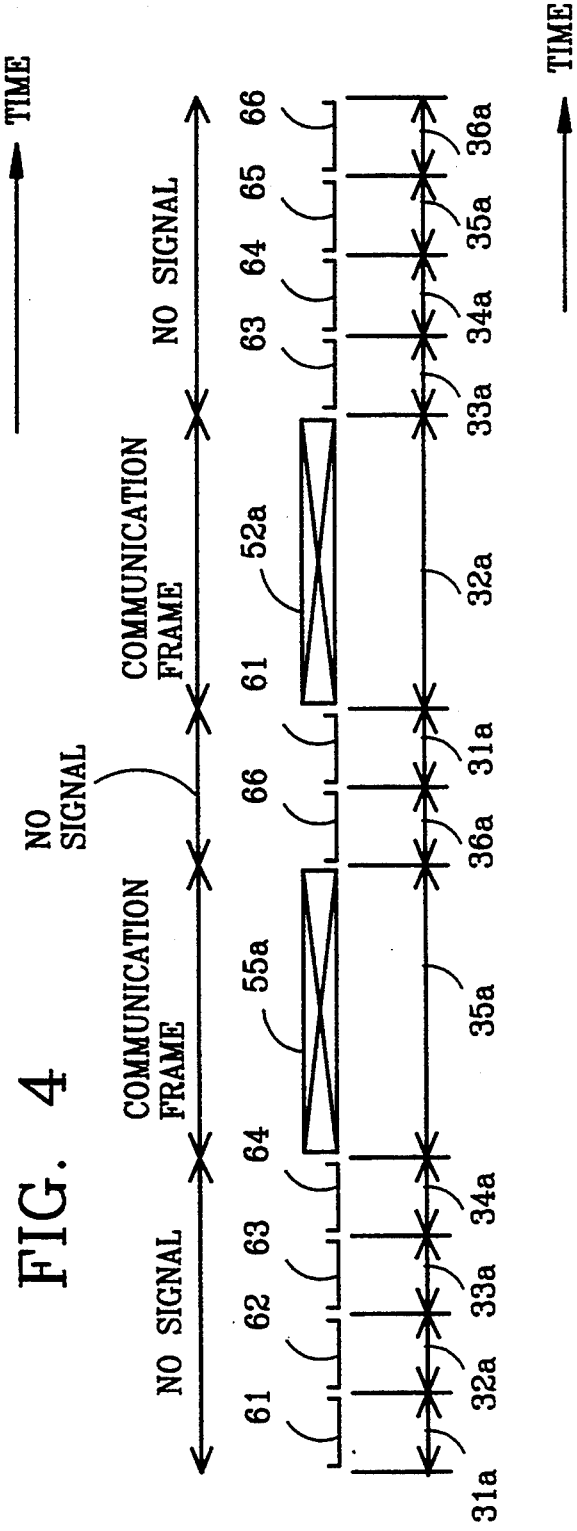

FIG. 9

| | PREAMBLE | START FRAME DELIMITER | DESTINATION ADDRESS | SOURCE ADDRESS | DATA LENGTH | DATA | FRAME CHECK SEQUENCE | END FRAME DELIMITER |
|---|---|---|---|---|---|---|---|---|
| PRIOR ART DATA | O | O | O | O | O | O | O | O |
| PRIOR ART NO DATA | O | O | O | O | O | X | O | O |
| EMBODIMENT 1 DATA | O | O | O | X | O | O | O | O |
| NO DATA | X | X | X | X | X | X | X | X |
| EMBODIMENT 2 DATA | O | O | O | TIMING CONTROL FLAG | O | O | O | O |
| NO DATA & NODE NUMBER=1 | O | O | O | TIMING CONTROL FLAG | O | X | O | O |
| NO DATA & NODE NUMBER≠1 | X | X | X | X | X | X | X | X |

FIG. 10

| | PREAMBLE | START FRAME DELIMITER | DESTINATION ADDRESS | SOURCE ADDRESS | DATA LENGTH | DATA | FRAME CHECK SEQUENCE | END FRAME DELIMITER |
|---|---|---|---|---|---|---|---|---|
| PRIOR ART DATA | ○ | ○ | ○ | ○ | ○ | ○ | ○ | ○ |
| PRIOR ART NO DATA | ○ | ○ | ○ | ○ | ○ | × | ○ | ○ |
| EMBODIMENT 1 DATA | ○ | ○ | ○ | ○ | ○ | ○ | ○ | ○ |
| NO DATA | × | × | × | × | × | × | × | × |
| EMBODIMENT 2 DATA | ○ | ○ | ○ | ○ | ○ | ○ | ○ | ○ |
| NO DATA & NODE NUMBER=1 | ○ | ○ | ○ | TIMING CONTROL FLAG | ○ | × | ○ | ○ |
| NO DATA & NODE NUMBER≠1 | × | × | × | × | × | × | × | × |

COMMUNICATION CONTROL METHOD

BACKGROUND OF THE INVENTION (1) Field of the Invention

The present invention relates to a communication control method for sequentially allocating transmitting rights to a plurality of nodes commonly connected to a single transmission line.

(2) Description of the Related Art

FIG. 1 is a block diagram showing an example of the construction of a communication control system to which a conventional communication control method is applied. In FIG. 1, reference numerals 11 to 16 denote a plurality of nodes. In the figure, six nodes are illustrated as an example. Reference numeral 2 denote a transmission line connected to these nodes 11 to 16 to be commonly used by them.

FIG. 2 is a time chart explaining a conventional communication control method. In FIG. 2, reference numerals 31, 32, ..., 36, 31, 32, ... indicate periods of transmitting rights respectively allocated to the nodes 11 to 16. The transmitting rights are sequentially allocated to the nodes 11 to 16. Reference numerals 41 to 46 (in the figure, the reference numeral 45 does not appear) are frames when the nodes 11-16 do not have data to be transmitted, and the reference numerals 51-55 (in the figure, only the reference numerals 5S and 52 appear) are frames when the nodes 11-16 have data to be transmitted. In the illustrated example, during the period 35, the transmitting right is allocated to the node 15, and the node 15 has data to be transmitted, so that the frame 45, which is transmitted when there is no data to be transmitted, does not appear, but instead, the frame 55, which is transmitted when there is data to be transmitted, appears. Also, during the second period 32 from the left in the figure, the node 12 has the transmitting right and there is data to be transmitted so that the frame 42, which is transmitted when there is no data to be transmitted, does not appear, but instead, the frame 52, which is transmitted when there is data to be transmitted, appears. In the other periods 31, 32, 33, 34, 36, and 31, the frames 41, 42, 43, 44, 46 and 41, which are transmitted when there is no data to be transmitted, are transmitted from the corresponding nodes 11, 12, 13, 14, 16, and 11 respectively.

Next, the operation in the conventional communication control method will be described. In the communication control system shown in FIG. 1 in which devices used in factory automation (FA) and so on are connected through a time division multiplex communication network, a control method is conventionally employed in which, in order to ensure that each receiving time of each of the communication frames is within a previously designed limited time period, chances to transmit signals from the respective nodes 11 to 16 are given in the order of node numbers of the respective nodes. In such a communication control system, the nodes 11 to 16 respectively transmit data to be transmitted to the transmission line 2 by using the corresponding communication frames 51 to 56, when the nodes 11 to 16 obtain the corresponding transmitting rights during the corresponding periods 31 to 36 of the transmitting rights respectively allocated to the nodes 11 to 16. When there is no data to be transmitted when the transmitting right is allocated to the own node, it is necessary to inform all of the other nodes of the node number of the own node which occupies the corresponding period 31, ..., or 36. To this end, the node generates a frame 41, ..., or 46 in which data indicating that there is no data to be transmitted and the node number of the own node are included, and transmits the frame to the transmission line 2. Thereby, all of the nodes 11, ..., and 16 recognizes each node number of each node which occupies each period 31, ..., or 36.

As documents disclosing prior art relating to such a conventional communication control method, Japanese Patent Publication (Kokai) No. 59-139743, Japanese Patent Publication (Kokai) No. 62-281595, and so on are known.

In the above-described conventional communication control method, there is a problem as follows. Namely, even when the node 11, ..., or 16 does not have data to be transmitted, the node must transmit the corresponding frame 41, ..., or 46 including data indicating that there is no data and including the own node number during the period 31, ..., or 36 allocated to the own node. Therefore, a problem arises in that it takes a long time to circulate the transmitting right from the node 11 having the minimum node number to the node 16 having the maximum node number 16.

SUMMARY OF THE INVENTION

The present invention has been achieved to solve the above-mentioned problem and has an object to provide a communication control method in which a period for occupying the transmission line by each node is shortened so as to enable the transmitting right to rapidly circulate from the node of the minimum node number to the node of the maximum node number.

According to the first aspect of the present invention, there is provided, for achieving the above objects, a communication control method for sequentially allocating transmitting rights to a plurality of nodes commonly connected to a single transmission line, wherein the control in each of the nodes comprises the steps of determining whether or not a current transmitting right is allocated to the own node, and forming, in the transmission line, a no signal state with a predetermined time period in which any signal is not transmitted to the transmission line, when the current transmitting right is the one allocated to the own node and when the own node has no data to be transmitted.

As stated above, according to the first aspect of the present invention, since the predetermined period of the no signal state in which any signal is not transmitted is formed in the transmission line when the current transmitting right is the one allocated to the own node and when the own node has no data to be transmitted, the duration of transmitting right of a node which has no data to be transmitted can be shortened so that the circulating period of the transmitting rights among the plurality of nodes can be shortened.

According to the second aspect of the present invention, in the above-mentioned communication control method, each of the nodes is provided with a node number for identifying the node, and the step of determining whether or not the current transmitting right is the one allocated to the own node is carried out by comparing the node number of the node having the current transmitting right with the node number of the own node.

As stated above, according to the second aspect of the present invention, whether or not the current transmitting right is the one allocated to the own node can be determined by comparing the node number of the node having the current transmitting right with the node number of the own node, so that it is not necessary to insert a node identification number of a transmitting node in the transmission line, resulting in that each communication frame can be shortened.

According to the third aspect of the present invention, in the above-mentioned communication control method, one of the nodes is defined as a particular node, and the control in the particular node comprises the steps of determining whether or not the current transmitting right is the one allocated to the particular node, and transmitting, when the current transmitting right is the one allocated to the particular node and when the particular node has no data to be transmitted, a timing control frame to said transmission line, and the control in each of the nodes further comprises the step of allocating, when the current transmitting right is not the one allocated to the own node and when the timing control frame is received by the own node, the next transmitting right to the node having a node number next to the particular node.

As stated above, according to the third aspect of the present invention, when the current transmitting right is not the one allocated to the own node and when the timing control frame is received by the own node, since the next transmitting right is set to the node having a node number next to the particular node, the node numbers of all of the nodes are refreshed one time during one circulating time period of the transmitting right from the node having the minimum node number to the node having the maximum node number, so that, even if the management of the transmitting right in a certain node becomes incorrect due to any reason, the management of the transmitting right in the node can be recovered in the next circulating time period, resulting in that the control of the transmitting right on the transmission line can be carried out more surely.

According to the fourth aspect of the present invention, the control in each of the nodes further comprises the step of transmitting, when the current transmitting right is the one allocated to the own node and when the own node has data to be transmitted, a communication frame including the data to be transmitted to the transmission line.

As stated above, according to the fourth aspect of the present invention, when the own node has data to be transmitted, a communication frame including the data to be transmitted is transmitted in stead of forming the no signal state, resulting in that a practical communication can be carried out.

According to the fifth aspect of the present invention, the predetermined time period of the no signal state is shorter than the period of a frame including data indicating that there is no data to be transmitted and indicating a node identification number, the period of the frame would being necessary if the frame were transmitted.

As stated above, according to the fifth aspect of the present invention, the period of the no signal state can be made shorter than the period of the conventional frame including the data indicating that there is no data to be transmitted and the node address of the source node. When the conventional frame does not include the node identification number, the period of the no signal state may be made shorter that the period of the frame including only the data indicating that there is no data to be transmitted.

According to the sixth aspect of the present invention, the control in each of said nodes further comprises the step of transferring the transmitting right to the next node in response to the end of the communication frame when the communication frame is transmitted or received, or in response to the end of the predetermined period when the own node has no data to be transmitted or when the communication frame is not received.

As stated above, according to the sixth aspect of the present invention, even when the no signal state is formed, the transmitting right is surely transferred to the next node.

The above and further objects and novel features of the invention will more fully appear from the following detailed description of the preferred embodiments when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a time chart explaining the conventional communication control method;

FIG. 4 is a time chart explaining a communication control method according to an embodiment of the present invention;

FIG. 9 is a table diagram showing the contents of frames in the prior art, in the first embodiment 1, and in the second embodiment 2, when the source address is not included in the frame of the first embodiment 1; and FIG. 10 is a table diagram showing the contents of frames in the prior art, in the first embodiment 1, and in the second embodiment 2, when the source address is included in the frame of the first embodiment 1.

DESCRIPTION OF THE PREFERRED EMBODIMENTS

Embodiment 1

In the following, an embodiment 1 of the present invention will be described with reference to the drawings. Throughout the specification, the same reference symbols denote the same or similar parts.

Figure 1:
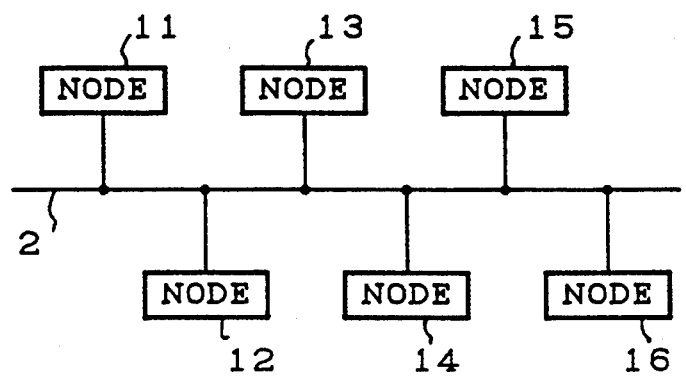
FIG. 1 is a block diagram showing an example of a communication system applied to a conventional communication control method.
Figure 3:
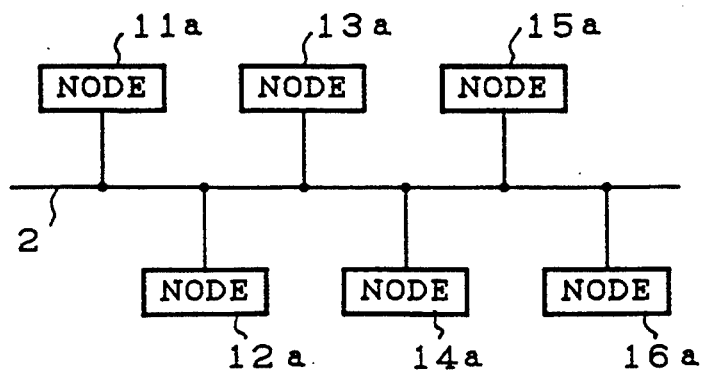
FIG. 3 is a block diagram showing an example of a communication control system applied to the communication control method according to the present invention.

FIG. 3 is a block diagram showing the system construction of a communication control system applied to the communication control method according to the present invention, which is similar to the conventional system shown in FIG. 1. In FIG. 3, reference symbols 11a to 16a are a plurality of nodes. In the figure, six nodes are illustrated as an example. Reference numeral 2 is a transmission line connected to these nodes 11a to 16a to be commonly used by them. It should be noted that, in FIG. 3, similar to the conventional system, all of the nodes 11a to 16a receive the same frame substantially simultaneously.

FIG. 4 is a time chart explaining the communication control method according to the embodiment 1 of the present invention. In FIG. 4, reference symbols 31a to 36a represent periods during which the transmitting right is allocated to the nodes 11a to 16a, respectively. Similar to the prior art, the transmitting right is sequentially allocated to the nodes 11a to 16a. Reference numerals 61 to 66 (in the figure, the reference numeral 65 does not appear) represent no signal states which are formed in the transmission line 2 when the nodes 11a–16a do not have data to be transmitted, and the reference numerals 51a–55a (in the figure, only the reference numerals 55a and 52a appear) are frames when certain of the nodes 11a–16a have data to be transmitted. In the illustrated example, with respect to the period 35a, during the first period 35a when viewed from the left side of the figure, the transmitting right is allocated to the node 15a, and the node 15a has data to be transmitted, so that the no signal state 65, which is formed when there is no data to be transmitted, does not appear, but instead, the frame 55a, which is transmitted when there is data to be transmitted, appears. Also, with respect to the period 32a, during the second period 32a from the left side in the figure, the node 12a has the transmitting right and there is data to be transmitted so that the no signal state 62, which is formed when there is no data to be transmitted, does not appear, but instead, the frame 52a, which is transmitted when there is data to be transmitted, appears. In the other periods 31a, 32a, 33a, 34a, 36a, and 31a, the no signal states 61, 62, 63, 64, 66 and 61 are formed in the transmission line 2 when there is no data to be transmitted by the corresponding nodes 11a, 12a, 13a, 14a, 16a, and 11a respectively. Each of the no signal states 61–66 is formed when the corresponding node has the transmitting right and when the node has no data to be transmitted. Each of the no signal states 61–66 has a predetermined time period during which any signal is transmitted to the transmission line 2.

Figure 5:
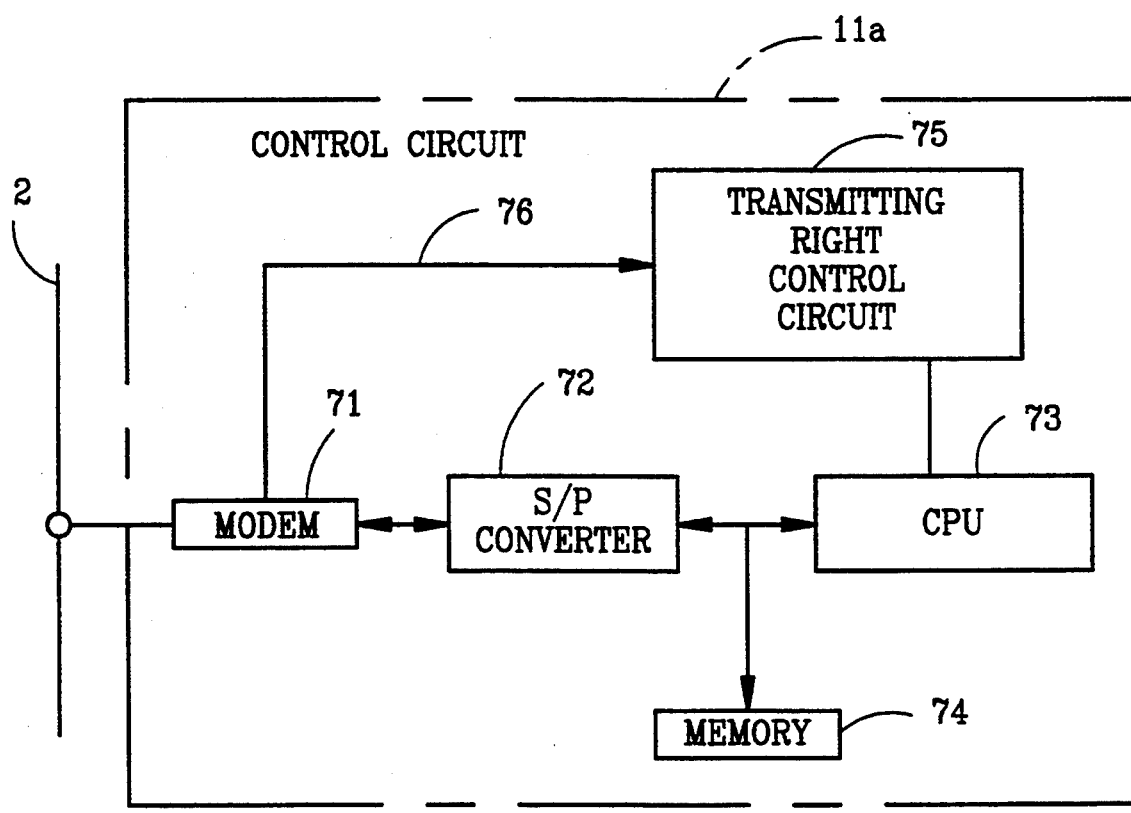
FIG. 5 is a block diagram showing an example of a construction of a node in a communication control system according to an embodiment of the present invention.

FIG. 5 is a block diagram showing an example of the construction of the node 11a in the communication system shown in FIG. 3. The other nodes 12a to 16a have the same constructions as the node 11a. In FIG. 5, reference numeral 71 is a modulator/demodulator (hereinafter referred to as a modem) for modulating a signal to be transmitted to the transmission line 2 and for demodulating a signal received from the transmission line 2, and 72 is a serial/parallel converter (hereinafter referred to as a S/P converter). Reference numeral 73 is a central processing unit (hereinafter referred to as a CPU) for controlling the whole of the node 11a, and 74 is a memory for storing a control sequence of the CPU 73 and necessary data. Reference numeral 75 is a transmitting right control circuit connected to the CPU 73, for controlling the sequential allocation of the transmitting right to the nodes 11a to 16a, and 76 is a line for conducting a signal representing whether or not there is a carrier signal transmitted from the modem 71 to the transmitting right control circuit 75. By detecting a carrier signal during transmitting or receiving a communication frame, the end of the transmitting or receiving frame is detected to transfer the transmitting right to the next node.

Next, the operation of the transmitting right control circuit 75 in the node 11a shown in FIG. 5 will be described with reference to the flow chart shown in FIG. 6. Here, it is assumed that the nodes 11a to 16a have node numbers "1" to "6", respectively. In addition, the node number "1" of the node 11a is compared with a node number of a transmitting right holding node which is counted up each time the node 11a transmits or receives a communication frame, or each time the no signal state is detected. When the node number of the transmitting right holding node coincides with the node number "1" of the own node 11a, the node 11a has the transmitting right. The other nodes 12a to 16a operate in a similar way the node 11a. The operation will be described in more detail as follows.

When the process starts, at a step ST1, a node number of a node having the transmitting right stored in the transmitting right control circuit 75 is set to "1". Hereinafter, the node number of the transmitting right holding node is referred to as a transmitting right holding node number. Then, at a step ST2, the node number of the own node is compared with the transmitting right holding node number. When they coincide, the process proceeds to a step ST3. When they do not coincide, the process proceeds to a step ST5. At the step ST3, it is determined whether or not there is data to be transmitted. When there is data to be transmitted, the process proceeds to a step ST4 so that the data to be transmitted is transmitted by including the data in the communication frame 51a, and then the process proceeds to a step ST8. On the contrary, at the step ST3, when it is judged that there is no data to be transmitted, the process proceeds to a step ST7 to set the no signal state 61, and the process proceeds to the step ST8. The no signal state 61 is set by waiting a predetermined time period. The predetermined time period is the period 31a corresponding to the node 11a when there is no data to be transmitted from the node 11a. The predetermined time period of the no signal frame is made to be shorter than the conventional transmitting right holding period including data indicating that there is no data to be transmitted and indicating a node identification number. Alternatively, the predetermined time period is made to be shorter than the period of a frame including only data indicating that there is no data to be transmitted and without including a node identification number. Therefore, the above-mentioned predetermined time period is sufficiently shorter than the transmitting time period of the conventional frame 41.

On the other hand, at the step ST2, when the transmitting right holding node number does not coincide with the node number of the own node, the process proceeds to a step ST5 to determine whether or not there is a carrier on the transmission line 2 by detecting a carrier presence/no presence signal 76 from the modem 71. When there is no carrier, this means that the state on the transmission line 2 is in the no signal state so that the process proceeds to the step ST7 to wait for the predetermined time period, and then the process proceeds to the step ST8.

At the step ST5, when it is judged that there is a carrier on the transmission line 2, this means that the transmission line 2 is not in the no signal state so that the process proceeds to a step ST6 to wait until the end of the carrier. At this time, a communication frame 52a, . . . , or 56a is transmitted from one of the other nodes 12a, 13a, ..., and 16a having the transmitting right. The frame length of the transmitted frame may be any length. When the end of the carrier is detected at the step ST6, the process proceeds to the step ST8.

At the step ST8, the transmitting right holding node number stored in the node 11a is incremented by one. Then the process proceeds to a step ST9 to judge whether or not the transmitting right holding node number is larger than the maximum node number. When the transmitting right holding node number is larger than the maximum node number (in this example, the maximum node number is "6"), the process proceeds to a step ST10 to set the transmitting right holding node number to be "1", and the process returns to the step ST2. At the step ST9, when the transmitting right holding node number is not larger than the maximum node number, the process returns to the step ST2 without changing the transmitting right holding node number. Then, the above-described operation is repeated.

As described above, when the current transmitting right is the one allocated to the own node and when the own node has no data to be transmitted, the node 11a, 12a, ..., or 16a forms, on the transmission line 2, a no signal state 61, 62, ..., or 66 of a predetermined time period in which any signal is not transmitted to the transmission line 2. On the other hand, when the current transmitting right is the one allocated to the own node and when the own node has data to be transmitted, the node 11a, 12a, ..., or 16a transmits a communication frame 51a, 52a, ..., or 56a including the data to be transmitted to the transmission line 2.

In addition, when the own node has the transmitting right, the end of the period 31a, 32a, ..., or 36a of the transmitting right is recognized by recognizing the end of the transmission of the communication frame or by waiting the predetermined time period. When another node other than the own node has the transmitting right, the end of the period of the transmitting right is recognized by waiting the predetermined time period when there is no carrier on the transmission line 2, and the end of the period of the transmitting right is recognized by the end of the carrier when there is a carrier on the transmission line 2.

It should be noted that, in each of the no signal states 61 to 66, no data is transmitted but only the predetermined time period is waited, so that the duration of each no signal state can be made sufficiently shorter than each of the conventional frames 41 to 46 including the data indicating that there is no data to be transmitted and indicating the node number of the own node. Accordingly, the circulating time of the transmitting right can be made much shorter in comparison with the prior art.

Embodiment 2

In the above-described embodiment 1, if any one of the nodes 11a to 16a loses the transmitting right holding node number which has been stored in the own node, the next transmitting right holding node number cannot be determined in the own node at the step ST8. The loss of the transmitting right holding node number may occur when the power supply of the node is cut or when some error occurs. Further, if any one of the nodes 11a to 16a is asynchronously driven to be connected to the transmission line 2, there is no guarantee that the transmitting right holding node number is correct.

To recover from the loss of the transmitting right within a short period, according to the second embodiment 2 of the present invention, one of the nodes is defined as a particular node having a function to transmit a timing control frame to the transmission line.

Figure 7:
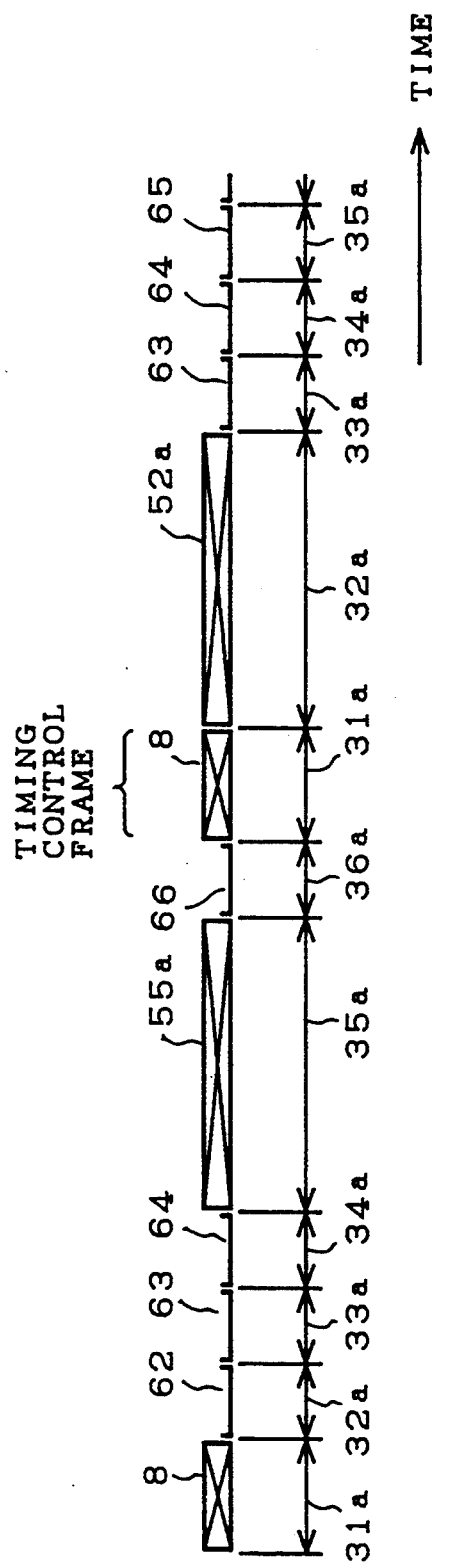
FIG. 7 is a time chart explaining a communication control method according to a second embodiment of the present invention.

FIG. 7 is a time chart explaining the communication control method according to the second embodiment 2 of the present invention. In FIG. 7, the same or corresponding parts to those in FIG. 4 are denoted by the same reference symbols, and the explanations thereof are omitted here. In FIG. 7, reference numeral 8 is the timing control frame which is transmitted from the node 11a, as an example, which is defined as the particular node. Namely, when current transmitting right is the one allocated to the particular node 11a and when the particular node 11a has no data to be transmitted, the timing control frame 8 is transmitted from the particular node 11a to the transmission line 2.

Next, the operation of the communication control method according to the second embodiment of the present invention will be described in detail with reference to a flow chart shown in FIG. 8.

Figure 6:
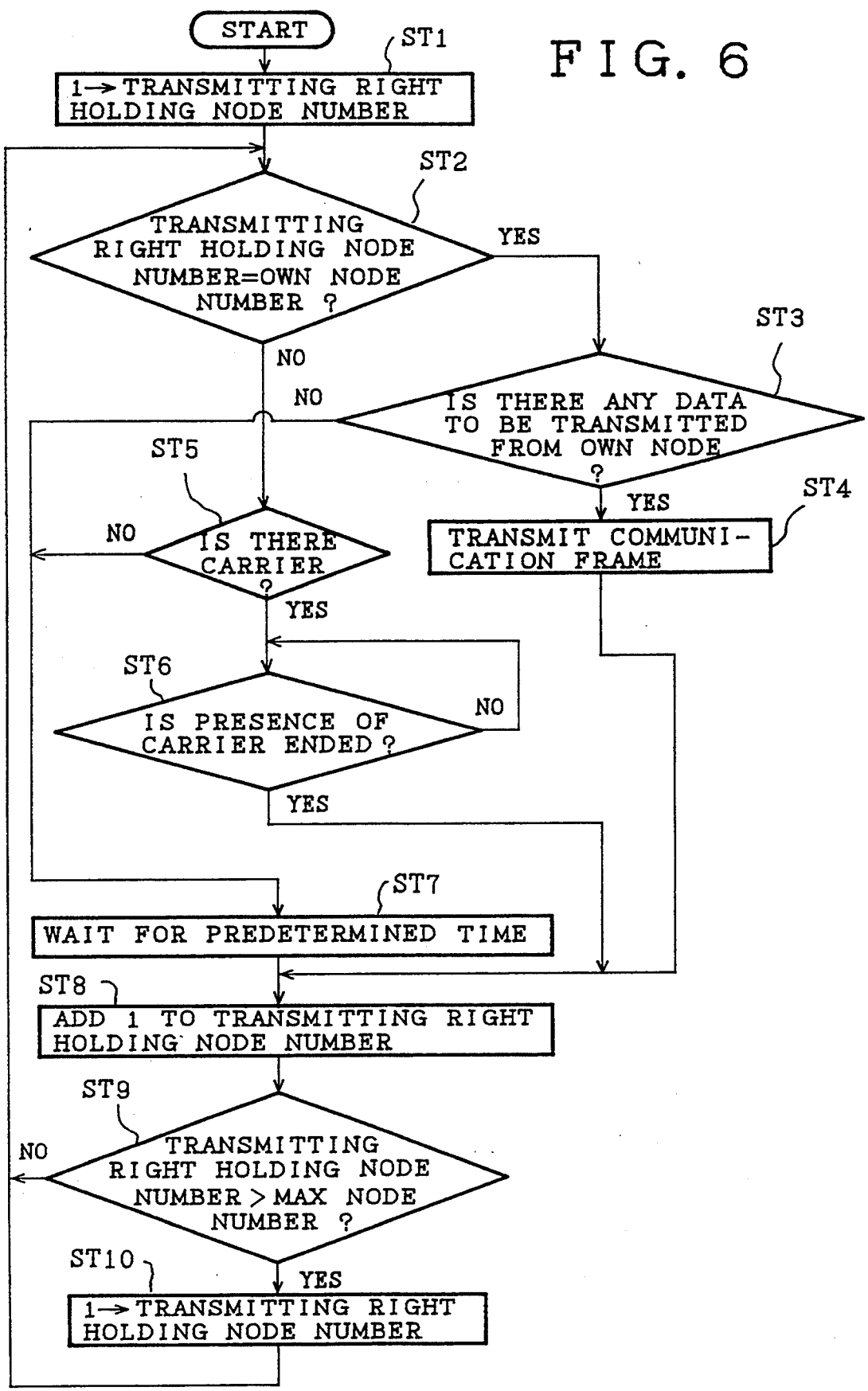
FIG. 6 is a flow chart explaining the operation of the node shown in FIG. 5.
Figure 8:
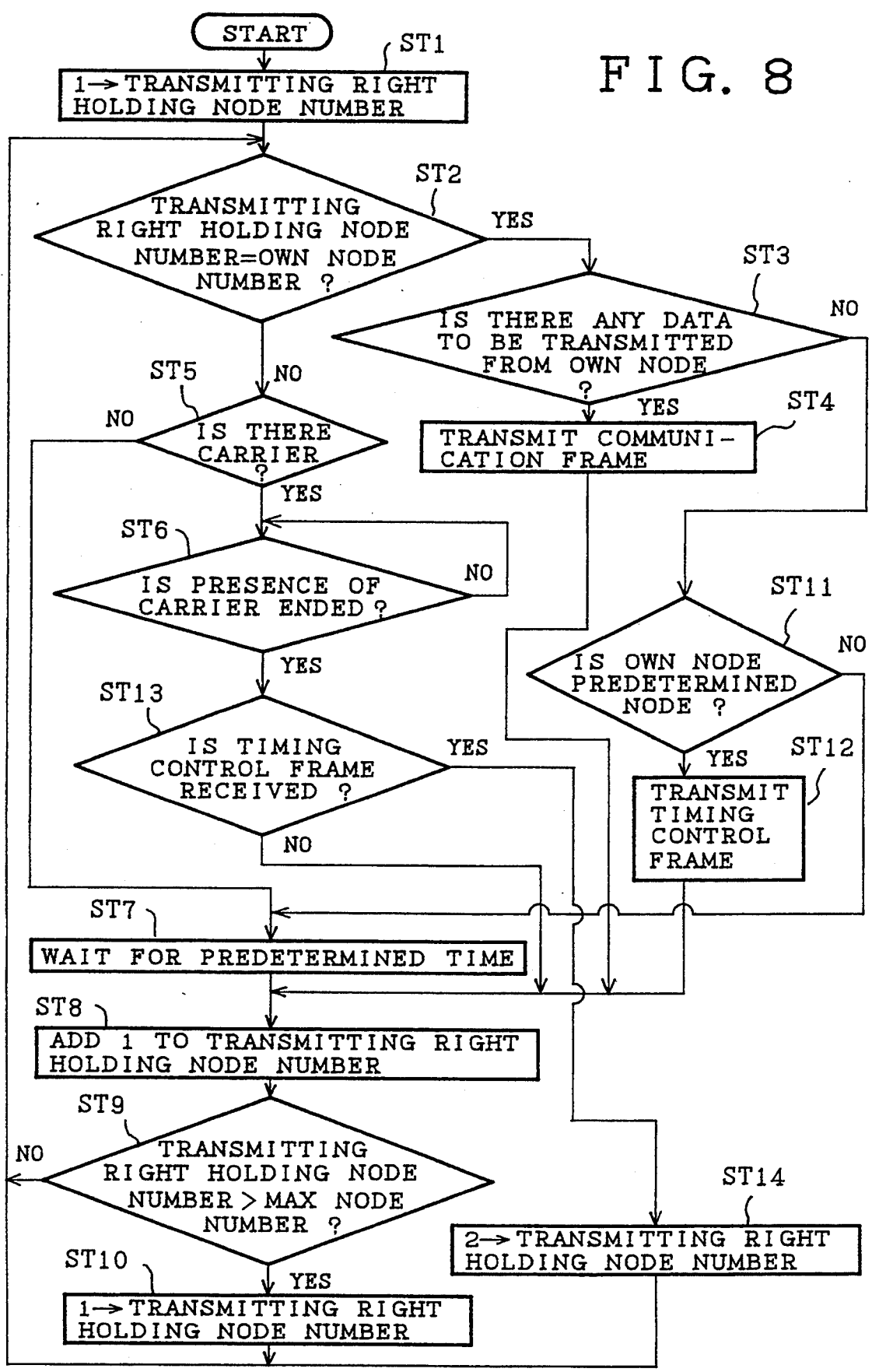
FIG. 8 is a flow chart explaining the operation in the above-mentioned second embodiment.

In FIG. 8, the basic operation is the same as the operation in the first embodiment 1 shown in FIG. 6, so that the explanation of the basic operation is omitted here. When a coincidence is detected between the transmitting right holding node number and the node number of the own node at the step ST2, and when it is judged that there is no data to be transmitted at the step ST3, the process proceeds to a step ST11. At the step ST11, it is determined whether or not the own node is the particular node. When the own node is not the particular node, the process directly proceeds to the step ST7. On the contrary, when the own node is the particular node, the process proceeds to a step ST12 at which a timing control frame 8 is generated and transmitted to the transmission line 2. The timing control frame 8 is the one for setting the next transmitting right holding node number to be "2", which is the next node number of the node number "1" of the particular node 11a. As an example of the timing control frame 8, at least one particular bit for identifying the timing control frame is included in the timing control frame.

On the other hand, at the step ST2, when the transmitting right holding node number is judged not to be coincident with the node number of the own node, and then at the step ST6, when the end of a carrier is detected, the process proceeds to a step ST13. At the step ST13, it is judged whether or not the received frame transmitted by the carrier is the timing control frame 8 transmitted from the particular node 11a. When the received frame is judged not to be the timing control frame 8, the process proceeds to the step ST8. On the contrary, when the received frame is judged to be the timing control frame 8, the process proceeds to a step ST14 at which the next transmitting right holding node number is set to be "2", and then the process returns to the step ST2.

The effects of the first and the second embodiments of the present invention will be more clearly understood from the following description with reference to FIG. 9 and FIG. 10.

FIG. 9 is a table diagram showing an example of the contents of frames in the prior art, in the first embodiment 1, and in the second embodiment 2, when the source address is not included in the transmitting frame of the first embodiment 1. In the illustrated example shown in FIG. 9, each frame in the prior art consists of eight entries, i.e., a preamble of one or more bytes, a start frame delimiter of one byte, a destination address of one to two bytes, a source address of one to two bytes, a data length of two bytes, a frame check sequence of two to four bytes, and an end frame delimiter of one byte.

In FIG. 9, a case in which there is no data to be transmitted in a node is considered. In this case, in the prior art, only the entry of "data" is not used and the other seven entries are filled with necessary data. By contrast, according to the first embodiment 1, all of the eight entries are not used but only the above-described predetermined short period is used. In the second embodiment, when the node is the particular node having the node number of "1" for example, the timing control frame is transmitted from the particular node. In the entry of the "source address" in the timing control frame, a timing control flag indicating the source node of the timing control frame is inserted. On the other hand, when the node is not the particular node, all of the eight entries are not used in the same way as in the first embodiment 1. Accordingly, according to the first and the second embodiments of the present invention, the duration of the transmitting right can be greatly shortened when there is no data to be transmitted.

In addition, when there is data to be transmitted in a node, in the prior art, all of the eight entries are filled with necessary data; by contrast, according to the first embodiment, the entry of the source address is not necessary in this example. Therefore, the frame length can be further shortened in comparison with that of the prior art. It should be noted that, in the second embodiment, when there is data to be transmitted, the communication frame must include a timing control flag in the entry of "source address" in order to inform the other nodes that the source of the communication frame is the particular node.

FIG. 10 is a table diagram showing another example of the contents of frames in the prior art, in the first embodiment 1, and in the second embodiment 2, when the source address is included in the transmitting frame. The difference between FIG. 9 and FIG. 10 is that, in FIG. 10, the entry of the "source address" in the frame is used in the first embodiment 1 when there is data to be transmitted. In this case also, the great advantage of shortening the frame length when there is no data transmitted can be obtained in the same way as in the above example shown in FIG. 9.

In the above described embodiments, the data length of each of the communication frames 51a to 56a has not been described, however, as long as each of the no signal states 61 to 66, which are set by the nodes 11a to 16a respectively when there is no data to be transmitted, has a constant time duration, and as long as the above-described processes are carried out, the data length of each of the communication frames 51a to 56a which are transmitted when there is data to be transmitted may be either a fixed length or a variable length. In both cases, the effects are substantially the same as those in the above described embodiments. It should be noted that when the data length of each of the communication frames 51a to 56a is a variable length, the data transmission can be made more flexible.

It should be noted that, as a communication control system to which the communication control method according to the above-described embodiments is applied, a time-division multiplex communication system or a time-division communication system may be used, however, as long as the method according to the above-described embodiments is employed, any other communication system may be used.

From the foregoing description, it will be apparent that according to the first aspect of the present invention, since the predetermined period of the no signal state in which any signal is not transmitted is formed in the transmission line when the current transmitting right is the one allocated to the own node and when the own node has no data to be transmitted, the duration of transmitting right of a node which has no data to be transmitted can be shortened so that the circulating period of the transmitting rights among the plurality of nodes can be shortened.

According to the second aspect of the present invention, whether or not the current transmitting right is the one allocated to the own node can be determined by comparing the node number of the node having the current transmitting right with the node number of the own node, so that it is not necessary to insert a node identification number of a transmitting node in the transmission line, resulting in that each communication frame can be shortened.

According to the third aspect of the present invention, in the above-mentioned communication control method, when the current transmitting right is not the one allocated to the own node and when the timing control frame is received by the own node, since the next transmitting right is set to the node having a node number next to the particular node, the node numbers of all of the nodes are refreshed one time during one circulating time period of the transmitting right from the node having the minimum node number to the node having the maximum node number, so that, even if the management of the transmitting right in a certain node becomes incorrect due to any reason, the management of the transmitting right in the node can be recovered in the next circulating time period, resulting in that the control of the transmitting right on the transmission line can be carried out more surely.

According to the fourth aspect of the present invention, the when the own node has data to be transmitted, a communication frame including the data to be transmitted is transmitted instead of forming the no signal state so that a practical communication can be carried out.

According to the fifth aspect of the present invention, the period of the no signal state can be made shorter than the period of the conventional frame including the data indicating that there is no data to be transmitted and the node address of the source node. When the conventional frame does not include the node identification number, the period of the no signal state may be made shorter that the period of the frame including only the data indicating that there is no data to be transmitted.

According to the sixth aspect of the present invention, since the transmitting right is transferred to the next node in response to the end of said communication frame when the communication frame is transmitted or received, or in response to the end of said predetermined period when the own node has no data to be transmitted or when the communication frame is not received even when the no signal state is formed, the transmitting right is surely transferred to the next node.

What is claimed is:

1. A communication control method for sequentially allocating transmitting rights among a plurality of nodes commonly connected to a single transmission line, wherein control in each of said nodes comprises the steps of:

determining whether a current transmitting right is allocated to the node; and causing said transmission line to assume a no signal state with a predetermined time period in which no signal is transmitted on said transmission line when the current transmitting right is allocated to the node and when the node has no data to be transmitted.

2. A communication control method as claimed in claim 1, wherein control in each of said nodes further comprises the step of transmitting, when the current transmitting right is the one allocated to the node and when the node has data to be transmitted, a communication frame including said data to be transmitted to said transmission line.

3. A communication control method as claimed in claim 1, wherein said predetermined time period of said no signal state is shorter than a period of a communication frame including data indicating that there is no data to be transmitted and indicating a node identification number.

4. A communication control method as claimed in claim 1, wherein said predetermined time period of said no signal state is shorter than a period of a communication frame including data indicating that there is no data to be transmitted.

5. A communication control method as claimed in claim 2, wherein control in each of said nodes further comprises the step of transferring the transmitting right to a next node in response to an end of said communication frame when said communication frame is transmitted or received, or in response to an end of said predetermined period when the node has no data to be transmitted or when said communication frame is not received.

6. A communication control method as claimed in claim 1, wherein each of said nodes is provided with a node number for identifying the node and wherein each node carries out the step of determining whether or not the current transmitting right is allocated to the node by comparing the node number of the node having the current transmitting right with its own node number.

7. A communication control method as claimed in claim 6, wherein one of said nodes is defined as a particular node, and wherein the control in said particular node comprises the steps of:

determining whether or not the current transmitting right is the one allocated to the particular node; and transmitting, when the current transmitting right is the one allocated to the particular node and when the particular node has no data to be transmitted, a timing control frame to said transmission line; and wherein control in each of said nodes further comprises the step of allocating, when the current transmitting right is not the one allocated to itself and when said timing control frame is received by the node, the next transmitting right to a predetermined node.

8. A communication control method as claimed in claim 7, wherein control in each of said nodes further comprises the step of transmitting, when the current transmitting right is allocated to the node and when the node has data to be transmitted, a communication frame including said data to be transmitted to said transmission line.

9. A communication control method as claimed in claim 7, wherein said predetermined time period of said no signal state is shorter than a period of a communication frame including data indicating that there is no data to be transmitted and indicating a node identification number.

10. A communication control method as claimed in claim 7, wherein said predetermined time period of said no signal state is shorter than a period of a communication frame including data indicating that there is no data to be transmitted.

11. A communication control method as claimed in claim 8, wherein control in each of said nodes further comprises the step of transferring the transmitting right to a next node in response to an end of said communication frame when said communication frame is transmitted or received, or in response to an end of said predetermined period when the node has no data to be transmitted or when said communication frame is not received.

12. A communication control method as claimed in claim 7, wherein each of said nodes is provided with a node number for identifying the node and wherein control in each of said nodes further comprises the step of storing a transmitting right holding node number corresponding to the next transmitting right, before the step of determining whether the current transmitting right is allocated to the node; and wherein each node carries out said step of determining whether or not the current transmitting right is allocated to the node by comparing the transmitting right holding node number with its own node number.

13. A communication control method as claimed in claim 7, wherein said predetermined node has a node number sequentially adjacent to a node number of said particular node.

14. A communication control method as claimed in claim 13, wherein the node number of said predetermined node is one greater than the node number of said particular node.

* * * * *